United States Patent [19]

Ohashi

[11] Patent Number: 5,257,110
[45] Date of Patent: Oct. 26, 1993

[54] IMAGE INFORMATION TRANSMISSION SYSTEM

[75] Inventor: Kazuhito Ohashi, Kanagawa, Japan

[73] Assignee: Canon Kabushiki Kaisha, Tokyo, Japan

[21] Appl. No.: 794,494

[22] Filed: Nov. 18, 1991

[30] Foreign Application Priority Data

| Nov. 22, 1990 | [JP] | Japan | 2-319497 |
| Nov. 22, 1990 | [JP] | Japan | 2-319498 |
| Nov. 22, 1990 | [JP] | Japan | 2-319499 |
| Nov. 22, 1990 | [JP] | Japan | 2-319500 |

[51] Int. Cl.$^5$ .............................................. H04N 5/95
[52] U.S. Cl. ...................................... 358/339; 358/323; 360/65
[58] Field of Search ............... 358/310, 335, 320, 323, 358/337, 339, 905; 382/43; 360/65

[56] References Cited

U.S. PATENT DOCUMENTS

| 4,947,252 | 8/1990 | Kobayashi et al. | 358/167 |
| 5,062,005 | 10/1991 | Kitaura | 358/342 |
| 5,075,802 | 12/1991 | Ohashi | 360/27 |

Primary Examiner—Mark R. Powell
Attorney, Agent, or Firm—Robin, Blecker, Daley & Driscoll

[57] ABSTRACT

An image information transmission system according to the present invention is a system for transmitting image information. The system is arranged to receive a transmitted analog image signal and form digital image data by sampling the received analog image signal, then set a transmission-path characteristic by performing discrete Fourier transform operations on data which constitute a predetermined part of the formed digital image data, and then apply waveform equalization correction processing to the formed digital image data in accordance with the set transmission-path characteristic. Accordingly, the system is capable of transmitting image information accurately without being influenced by time base variations which occur on a transmission path.

26 Claims, 13 Drawing Sheets

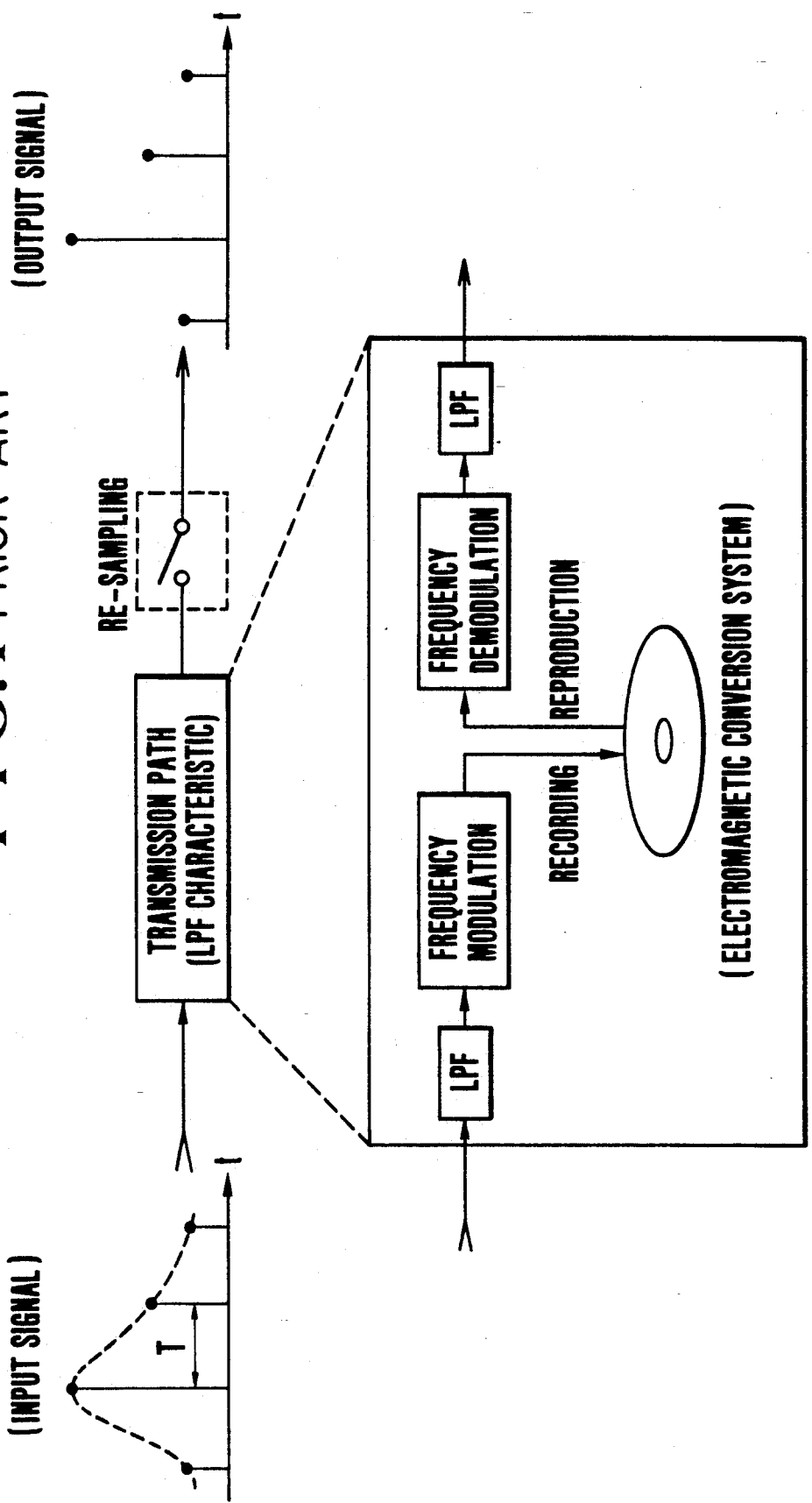

Y

C1 (R-Y)

C2 (B-Y)

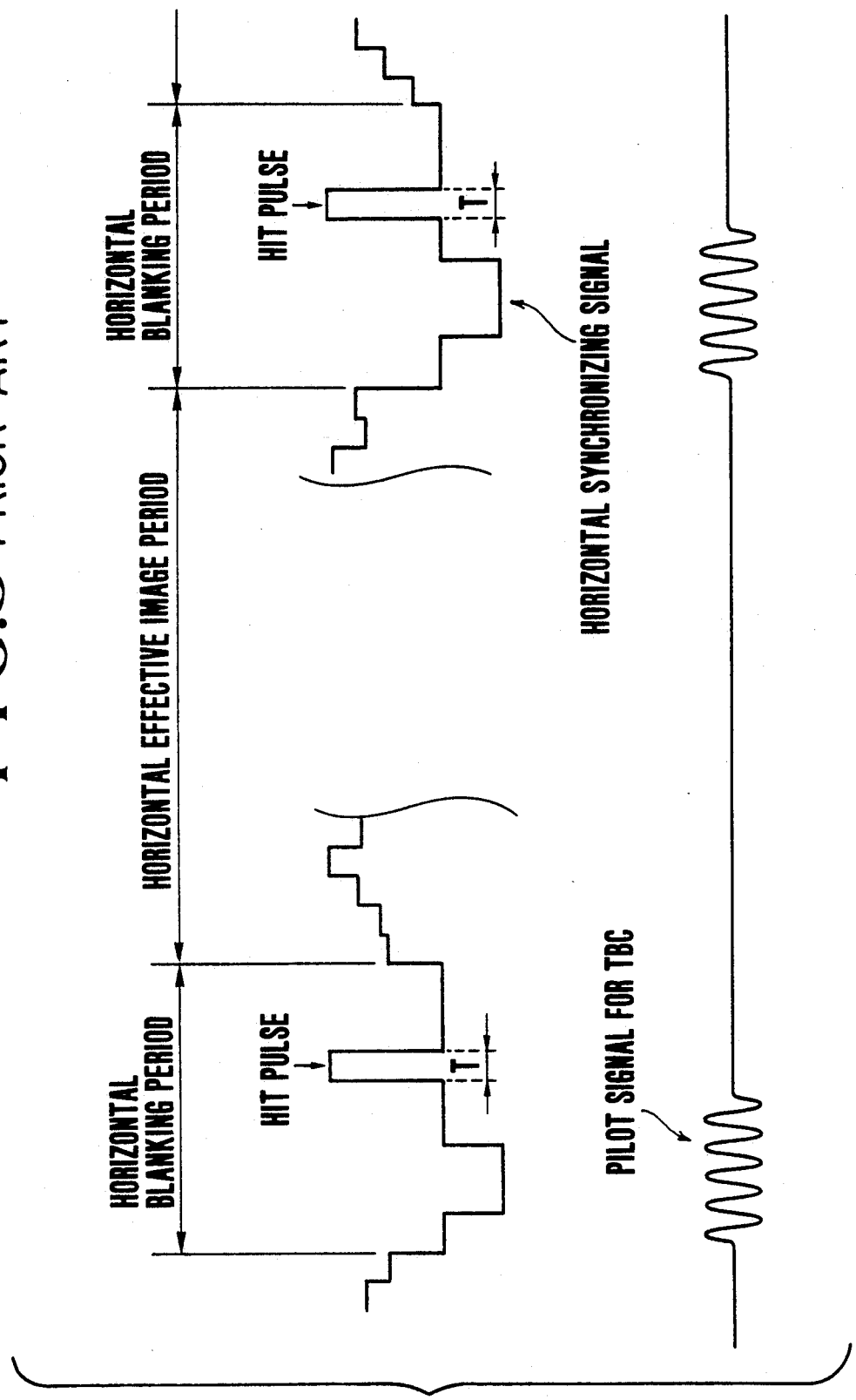

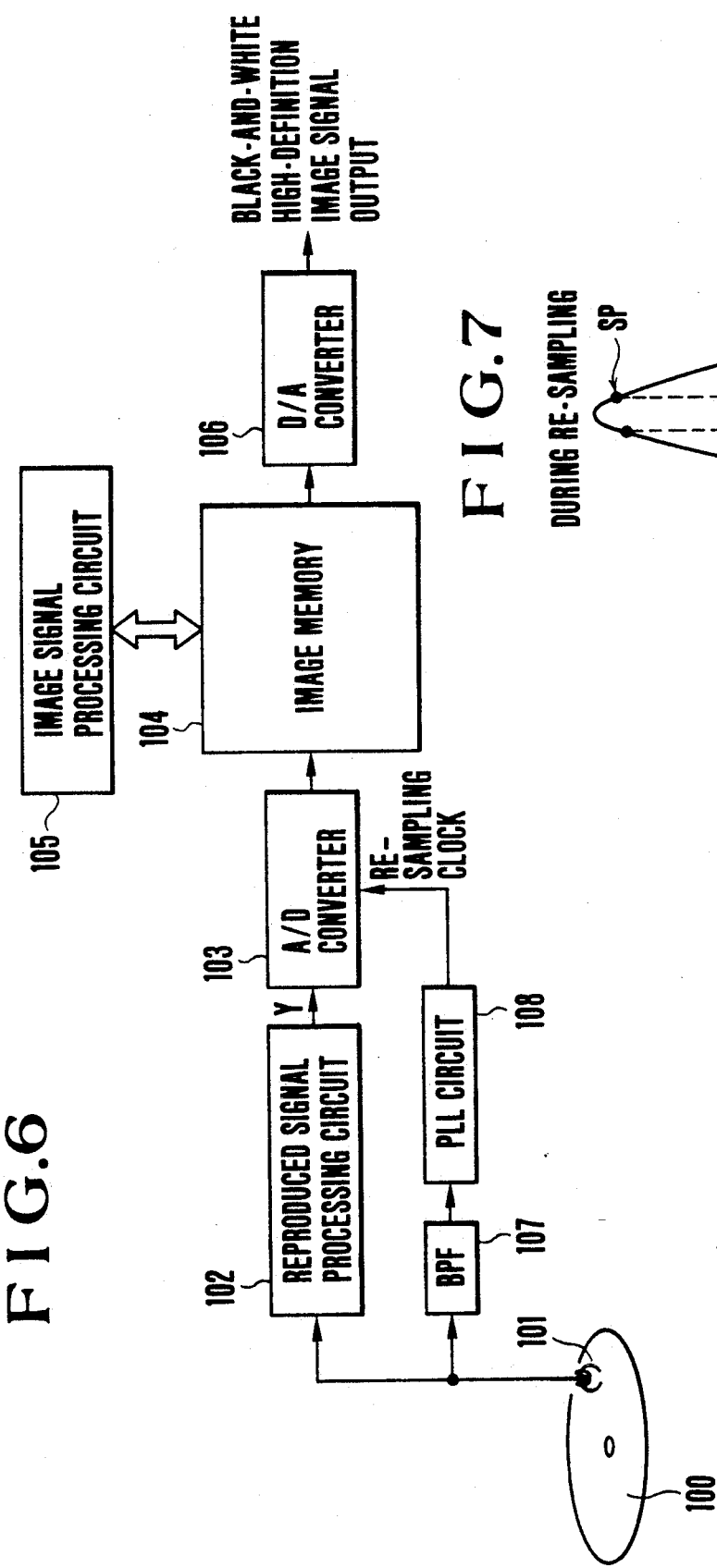

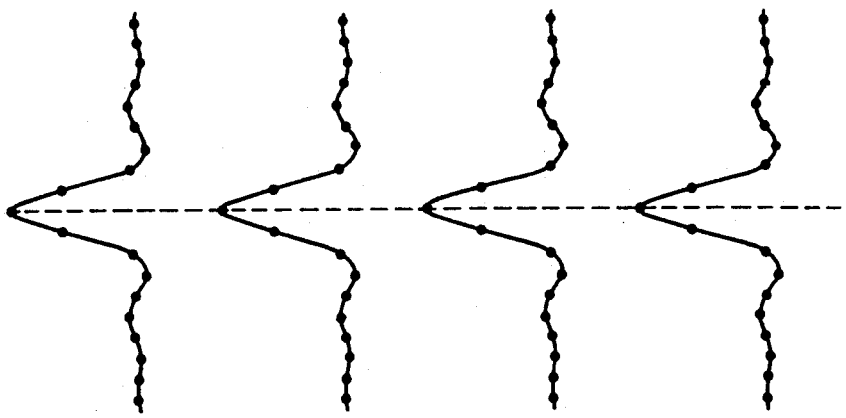
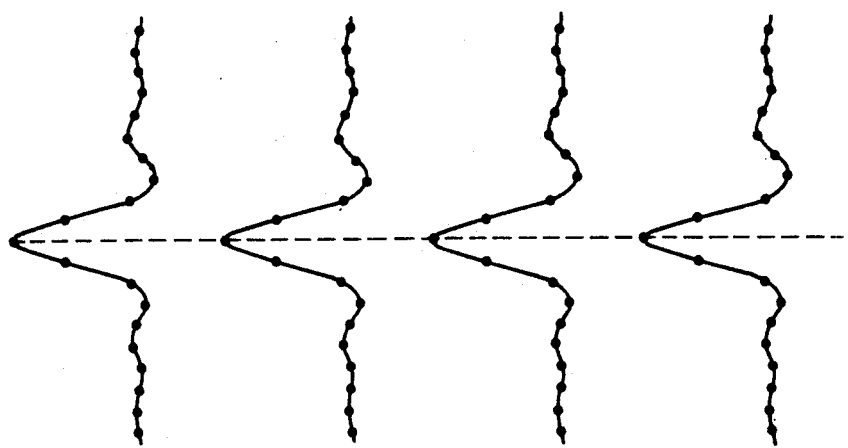
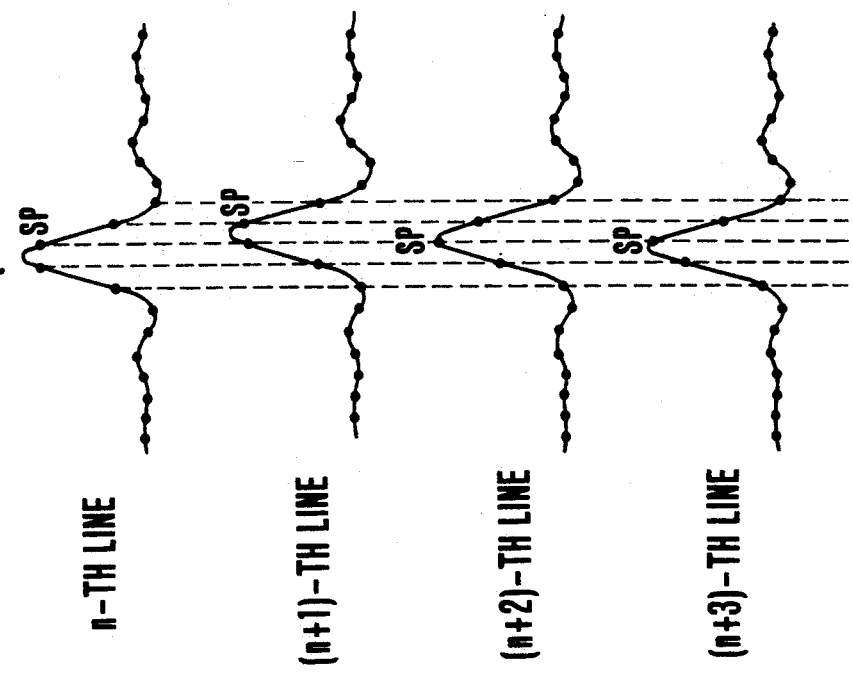

DURING RE-SAMPLING

AFTER WAVEFORM EQUALIZATION

F I G. 12
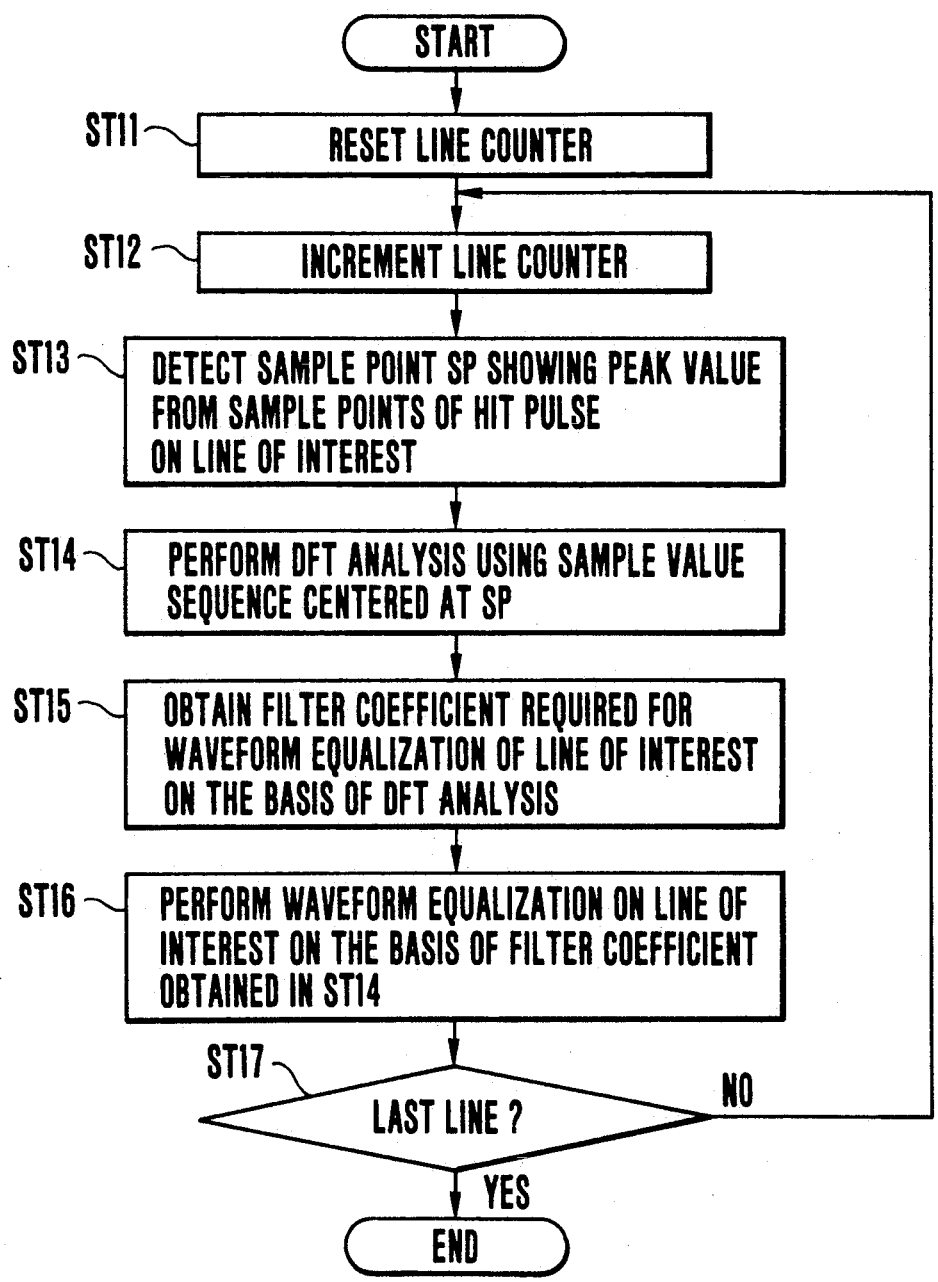

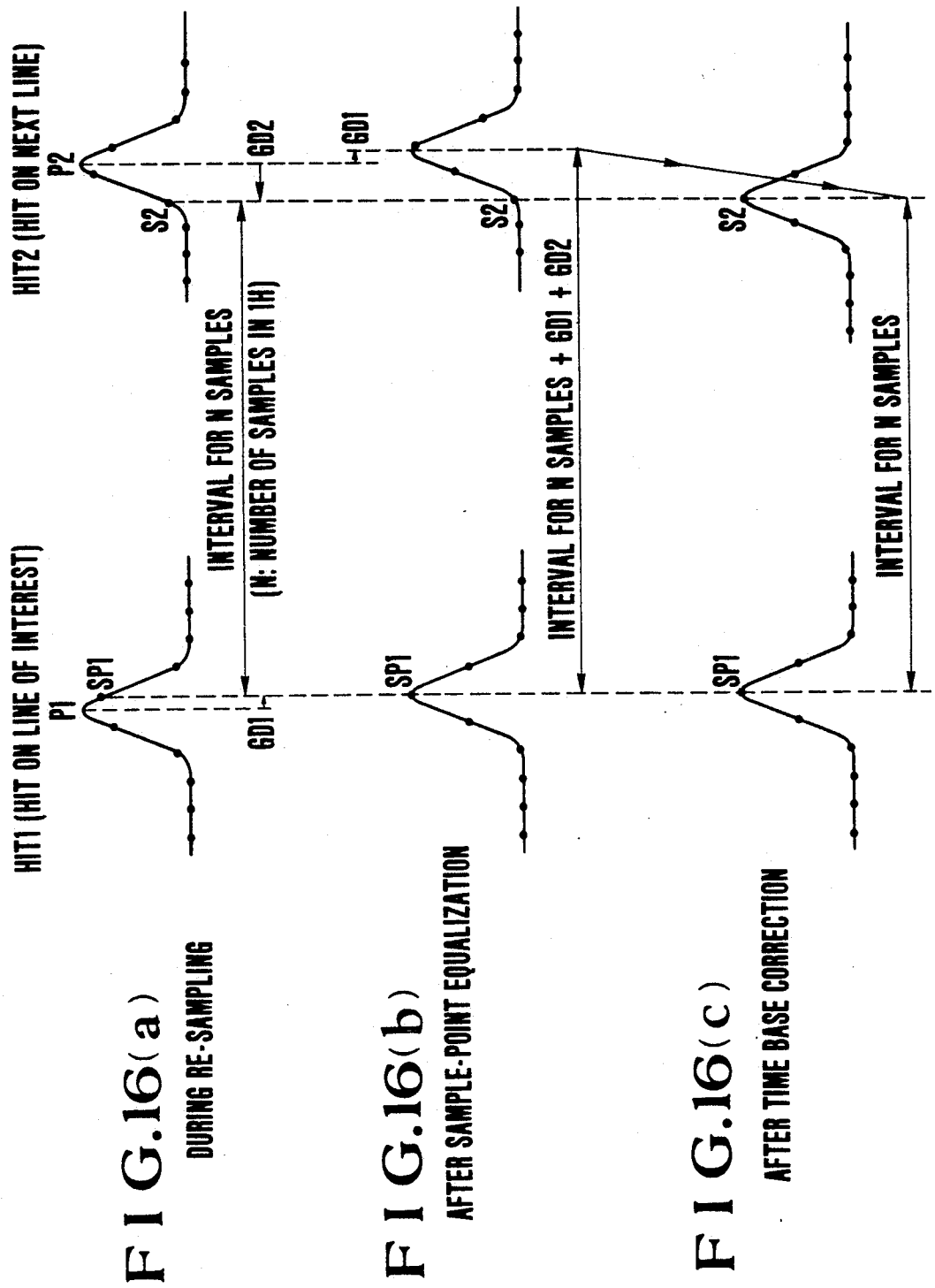

IMAGE INFORMATION TRANSMISSION SYSTEM

BACKGROUND OF THE INVENTION

1. Field of the Invention

The present invention relates to an image information transmission system for transmitting image information.

2. Description of the Related Art

An electronic still video system is known as one conventional example of an image information transmission system for transmitting image information. The electronic still video system is arranged to record a still image signal on a magnetic disc which serves as a recording medium, and to reproduce a still image signal recorded on the magnetic disc.

Such an electronic still video system conforms to an existing television system such as the NTSC system or the PAL system, and it is difficult to record or reproduce an image of high resolution by the electronic still video system. However, in preparation for the advent of a high-definition television system such as that proposed by the Nippon Hōsō Kyokai (NHK), a CHSV (Compatible High-Definition Still Video) system has already been proposed which can record and reproduce an image signal of a resolution of approximately 1,000 pixels in the vertical direction and approximately 1,300 pixels in the horizontal direction.

The CHSV system utilizes a technique called analog transmission of sample values for recording and reproducing an image signal. The analog transmission of sample values is intended to transmit correctly a sample-value sequence of time interval T by using an analog transmission path having a predetermined limited band.

Requirements for realizing the aforesaid analog transmission of sample values are as follows:

(1) It is necessary to meet the well-known Nyquist condition that the frequency characteristic of an analog transmission path has a linear phase and a symmetrical roll-off characteristic centered at a frequency of $\frac{1}{2}T$.

(2) It is necessary to perform re-sampling on a reception side, i.e., during reproduction, in accordance with a time base which is not offset from that of sampling performed during recording.

The CHSV system is basically arranged to satisfy the aforesaid requirements and also to record and reproduce a sequence of sample values of an image signal in a recording format which conforms to the conventional electronic still video system, as shown in FIG. 1.

FIGS. 2(a), 2(b) and 2(c) are illustrations showing sampling positions on a luminance signal Y, a color-difference signal C1(R−Y) and a color-difference signal C2(B−Y), respectively. As shown in FIGS. 2(a), 2(b) and 2(c), respectively, the luminance signal Y is divided into four signals, YA (sample points on a (4n+0)−th line), YB (sample points on a (4n+1)−th line), YC (sample points on a (4n+2)−th line) and YD (sample points on a (4n+3)−th line); the color-difference signal C1(R−Y), into four signals, C1A (sample points on an (8n+0)−th line), C1B (sample points on an (8n+2)−th line), C1C (sample points on an (8n+4)−th line), and C1D (sample points on an (8n+6)−th line); and the color-difference signal C2(B−Y), into four signals, C2A (sample points on an (8n+1)−th line), C2B (sample points on an (8n+3)−th line), C2C (sample points on an (8n+5)−th line), and C2D (sample points on an (8n+7)−th line). The sample-value sequences of the thus-divided signals are recorded on four tracks on the magnetic disc in a predetermined combination.

A frequency-modulated luminance signal FM−Y and a frequency-modulated color-difference line-sequential signal FM−C are recorded on each of the four tracks on the magnetic disc in a frequency-multiplexed state as shown in FIG. 3. The combination of the frequency-modulated luminance signal FM−Y and the frequency-modulated color-difference line-sequential signal FM−C is, for example, such that the luminance signal YA and the color-difference line-sequential signal C1A/C2C are recorded on the first track, the luminance signal YB and the color-difference line-sequential signal C2A/C1C on the second track, the luminance signal YD and the color-difference line-sequential signal C2B/C1D on the third track, and the luminance signal YC and the color-difference line-sequential signal C1B/C2D on the fourth track.

Accordingly, track patterns on the magnetic disc on which the luminance signals and the color-difference line-sequential signals have been recorded in the above-described combination are as shown in FIG. 4.

It is to be noted that the high-definition image signal which has been recorded on each track on the magnetic disc in the above-described manner conforms to a conventional electronic still video format. Accordingly, field reproduction from each track is possible and frame reproduction is also possible from the second and third tracks.

In the case of the reproduction of the high-definition image signals which have been recorded on the four tracks in the above-described divided form, re-sampling is performed for positions identical to those of sampling performed during the recording. Re-sampled information is stored in a memory, and information on the sample points shown as X in FIGS. 2(a), 2(b) and 2(c) is interpolated by using information on the sample points shown as O. Thus, the high-definition still image signal of 1,000 pixels × 1,300 pixels is restored.

In the CHSV system, since the sampled information is recorded and reproduced on and from the magnetic disc in the above-described manner, jitters occur in a rotating system for the magnetic disc and time base variations occur in a signal reproduced from the magnetic disc. As a result, the aforesaid requirement for realizing the analog transmission of sample values, i.e., the requirement that sampling positions for recording coincide with those for reproduction, is not satisfied.

To cope with this problem, at the time of recording by the conventional CHSV system, in each of horizontal blanking periods such as those shown in FIG. 5, a burst-like pilot signal for time base correction (TBC) is frequency-multiplexed onto a frequency band of 2–3 MHz in FIG. 3, i.e., a valley between the frequency band of the frequency-modulated luminance signal FM−Y and the frequency band of the frequency-modulated color-difference line-sequential signal FM−C, as viewed in FIG. 3. With respect to the luminance signal, one HIT (Horizontal Interval Test) pulse whose pulse width T corresponds to one sampling period is added in each horizontal scanning period as shown in FIG. 5. During reproduction by the conventional CHSV system, re-sampling clock signals which follow jitters occurring in the rotating system are generated by a PLL (Phase-Locked Loop) circuit by using the pilot signals for TBC which have been frequency-multiplexed during the recording and, in addition, phase matching of the resampling clock signals is performed by using the HIT pulses added during the recording. Information on the positions of sampling performed during the recording is obtained by performing re-sampling with the re-sampling clock signals.

If the stability of the electronic still video system and the influence of noise or the like are taken into account, a loop filter in the PLL circuit for forming the re-sampling clock signals which follow the jitters occurring in the rotating system will be designed to have a cutoff frequency of not higher than several hundred kilohertz. As a result, if jitters of frequency more than the cutoff frequency occur, it is impossible to maintain a correct sampling phase, thus resulting in the problem that no analog transmission of correct sample values can be performed.

SUMMARY OF THE INVENTION

It is, therefore, an object of the present invention to provide an image information transmission system capable of solving the above-described problems.

Another object of the present invention is to provide an image information transmission system capable of accurately transmitting image information without being influenced by time base variations occurring on a transmission path.

To achieve the above-described objects, according to one aspect of the present invention, there is provided an image information transmission system for transmitting image information, which comprises digital-image-data forming means for receiving a transmitted analog image signal, sampling the received analog image signal and forming digital image data, transmission-path-characteristic setting means for setting a transmission-path characteristic by performing discrete Fourier transform operations on data which constitute a predetermined part of the digital image data formed by the digital-image-data forming means, and waveform equalization correction processing means for applying waveform equalization correction processing to the digital image data formed by the digital-image-data forming means, in accordance with the transmission-path characteristic set by the transmission-path-characteristic setting means.

Another object of the present invention is to provide an image information transmission system capable of eliminating accurately and stably time base variations occurring on a transmission path during the transmission of image information.

To achieve the above-described object, according to another aspect of the present invention, there is provided an image information transmission system for transmitting image information, which comprises digital-image-data forming means for receiving a transmitted analog image signal, sampling the received analog image signal and forming digital image data, transmission-path-characteristic setting means for setting a transmission-path characteristic by performing discrete Fourier transform operations on data which constitute a predetermined part of the digital image data formed by the digital-image-data forming means, and sample point equalization correction processing means for applying sample point equalization correction processing to the digital image data formed by the digital-image-data forming means, in accordance with the transmission-path characteristic set by the transmission-path-characteristic setting means.

Another object of the present invention is to provide an image information transmission system capable of restoring transmitted image information accurately and stably, without being influenced by time base variations occurring on a transmission path.

To achieve the above-described object, according to another aspect of the present invention, there is provided an image information transmission system for transmitting image information, which comprises digital-image-data forming means for receiving a transmitted analog image signal, sampling the received analog image signal and forming digital image data, first-transmission-path-characteristic setting means for setting a first transmission-path characteristic by performing discrete Fourier transform operations on data which constitute a predetermined part of the digital image data formed by the digital-image-data forming means, sample phase equalization correction processing means for applying sample phase equalization correction processing to the digital image data formed by the digital-image-data forming means, in accordance with the first transmission-path characteristic set by the first-transmission-path-characteristic setting means, second-transmission-path-characteristic setting means for setting a second transmission-path characteristic by performing discrete Fourier transform operations on average values of data which constitute a predetermined part of the digital image data formed by the digital-image-data forming means, and amplitude equalization correction processing means for applying amplitude equalization correction processing to the digital image data formed by the digital-image-data forming means, in accordance with the second transmission-path characteristic set by the second-transmission-path-characteristic setting means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a schematic illustration showing the principle of analog transmission of sample values;

FIG. 5 is a timing chart showing TBC pilot signals and HIT pulses added during recording in the CHSV system;

FIG. 6 is a schematic block diagram showing the arrangement of a reproducing apparatus in a CHSV system according to a first embodiment of the present invention;

FIG. 7 is an explanatory diagram of waveform equalization processing carried out in the first embodiment;

FIGS. 9(a), 9(b) and 9(c) are schematic illustrations showing the manner in which HIT pulses are corrected by waveform equalization processing according to the first embodiment;

FIG. 12 is a flowchart of a waveform equalization processing operation carried out in the image signal processing circuit 105 of FIG. 6 used in the second embodiment;

FIGS. 16(a), 16(b) and 16(c) are schematic illustrations showing the manner in which HIT pulses are corrected by sample point equalization processing and time base correction processing according to the fourth embodiment.

DETAILED DESCRIPTION OF THE PREFERRED EMBODIMENTS

Figure 2A:
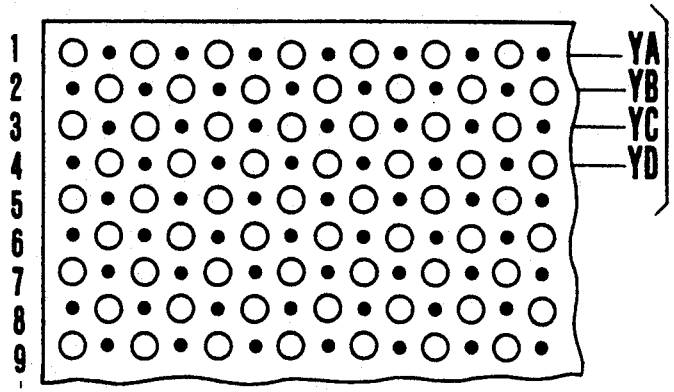
FIGS. 2(a), 2(b) and 2(c) are schematic illustrations respectively showing the sample patterns of a luminance signal Y and color-difference signals C1 and C2.
Figure 2B:
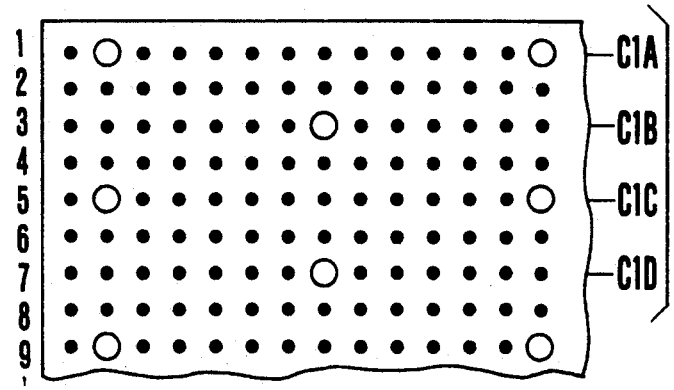
Figure 2C:
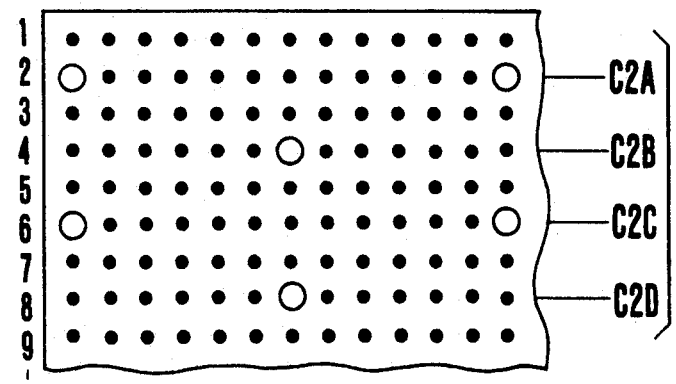
Figure 3:
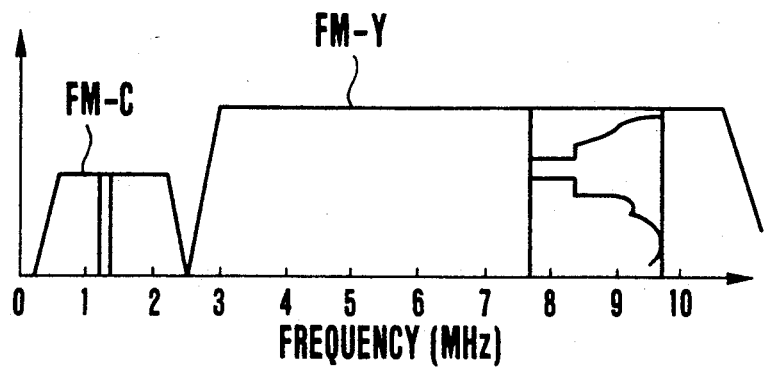
FIG. 3 is a schematic illustration showing the frequency allocation of a recorded signal in an electronic still video format.
Figure 4:
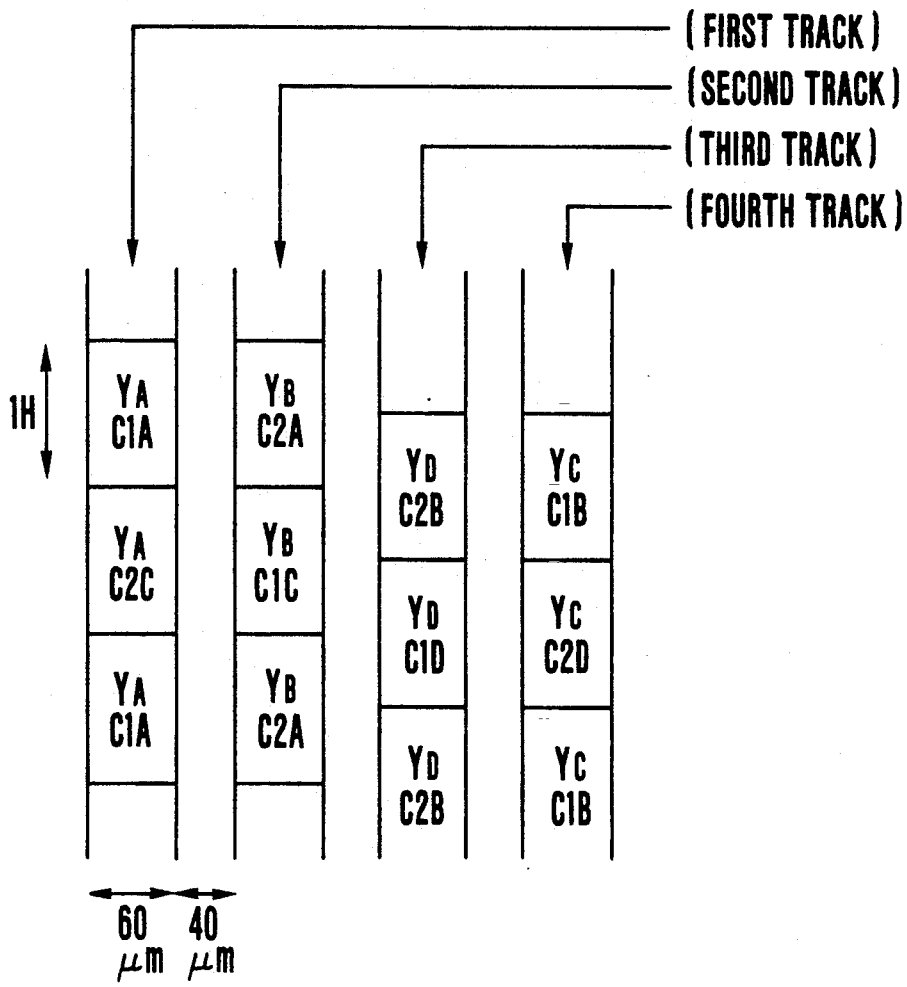
FIG. 4 is a schematic illustration showing the pattern of recorded tracks in a CHSV system.

Preferred embodiments of the present invention will be described below with reference to the accompanying drawings.

FIG. 6 is a block diagram schematically showing the arrangement of a reproducing apparatus incorporated in a CHSV system according to a first embodiment of the present invention.

For the sake of simplicity, the following explanation is made on the assumption that the CHSV system according to the first embodiment transmits (records/reproduces) black-and-white image information. However, the present invention is also applicable to a system for transmitting color image information.

Referring to FIG. 6, a signal reproduced from a magnetic disc 100 by a magnetic head 101 is subjected to predetermined SV signal processing such as frequency demodulation and de-emphasis and converted into a baseband luminance signal in a reproduced signal processing circuit 102. The baseband luminance signal is supplied to an A/D converter 103, where the baseband luminance signal is converted from analog form to digital form in synchronism with a sampling clock of a period which is half a sampling period T (i.e., T/2) in the CHSV system. The output from the A/D converter 103 is stored in an image memory 104.

The sampling clock supplied to the A/D converter 103 is formed in the following manner. The reproduced signal outputted from the magnetic head 101 is also supplied to a and-pass filter (BPF) 107, where a pilot signal for TBC which has been frequency-multiplexed during recording is separated from the reproduced signal. In a PLL circuit 108 which follows the BPF 107, the aforesaid sampling clock is formed in phase synchronism with the pilot signal for TBC separated in the BPF 107.

The above-described processing is applied to the signal reproduced from each of four tracks on the magnetic disc 100. After the digitized luminance signals reproduced from the four tracks on the magnetic disc 100 have been stored in the image memory 104, an image signal processing circuit 105 applies, to the digital luminance signals stored in the image memory 104, predetermined processing such as waveform equalization processing according to the present invention and interpolation processing for image information which has not been transmitted, as will be described later. Thus, the reconstruction of an image is performed on the image memory 104. Then, the reconstructed image is sequentially read from the image memory 104 into a D/A converter 106, where it is converted into an analog luminance signal in accordance with an accurate clock signal generated by a clock signal generator which is not shown. Thus, a black-and-white high-definition image signal having a resolution equivalent to that of the high-definition television format is outputted to a monitor (not shown) or the like.

The waveform equalization processing in the image signal processing circuit 105 of FIG. 6 will be described below.

Since the CHSV system employs a method which is called the analog transmission of sample values as described above, it is necessary to perform re-sampling in correct phase on a reproduction side. For this reason, as described previously, one HIT pulse whose pulse width T is equivalent to one sampling period is recorded in such a manner that it is added to each horizontal synchronizing period as a phase reference signal as shown in FIG. 5.

FIG. 7 is a diagram showing a waveform formed when such a HIT pulse is re-sampled in the A/D converter of FIG. 6.

The frequency characteristic of a transmission path which includes recording and reproduction parts is a cosine roll-off characteristic which is centered at a frequency of $\frac{1}{2}T$ to satisfy the aforesaid Nyquist condition. Therefore, the data sequence re-sampled at intervals of T/2 in the A/D converter 103 satisfies a well-known sampling theorem. However, as described above, if re-sampling clocks, formed by the PLL circuit 108 on the basis of the pilot signal for TBS in the above-described manner, does not completely follow jitters occurring in a rotating system, a sample point SP does not coincide with the peak point of the HIT pulse as shown in FIG. 7.

Figure 8:
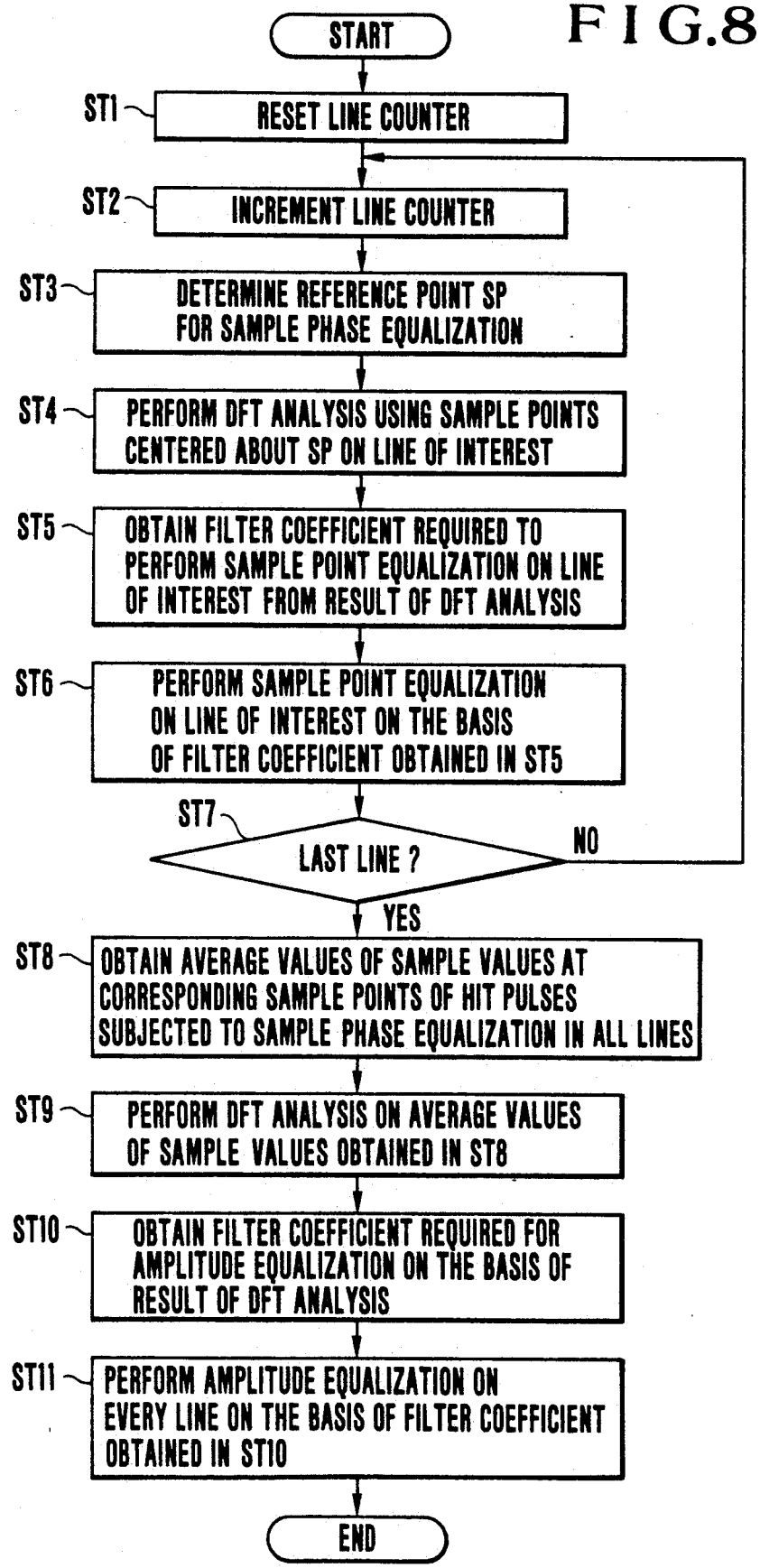
FIG. 8 is a flowchart of a waveform equalization processing operation carried out in an image signal processing circuit 105 of FIG. 6 used in the first embodiment.

For this reason, in the first embodiment, sample phase equalization and amplitude equalization are applied to the digital image signal stored in the image memory 104, on the basis of the waveform equalization processing flowchart shown in FIG. 8.

There are two major reasons why the waveform equalization processing carried out in the first embodiment is, as described above, separated into the sample phase equalization and the amplitude equalization:

(1) To eliminate the influence of a high-frequency jitter component which cannot be absorbed even with the PLL circuit 108, it is necessary to carry out the sample phase equalization for each line of an image.

(2) If the deterioration of an S/N ratio due to recording/reproduction is taken into account, it is necessary to carry out the amplitude equalization on the basis of re-sample values of a HIT pulse obtained after noise elimination processing utilizing averaging processing or the like has been performed.

As shown in FIG. 8, sample point equalization processing is performed in Steps ST1 to ST7. First, in Step ST1, a line counter in the image signal processing circuit 105 is reset, and in Step ST2, the count of the line counter is incremented.

In Step ST3, for example, a plurality of sample data corresponding to the HIT pulse in a line of interest are read from the image memory 104 and the maximum value of the values of the respective read sample data is set as the reference point SP for the sample phase equalization.

Then, in Step ST4, a DFT (discrete Fourier transform) analysis is performed by using sample data centered about the reference value SP set in Step ST3. Incidentally, since a concrete method of the DFT analysis is as described in "One Measurement Method for Group Delay Characteristics in Television Image Transmission System", the Institute of Television, Publication Vol. 39, No. 11 (1985), a detailed description is omitted herein. As described above, the HIT pulse is an isolated pulse of pulse width T which is added in each horizontal blanking period, and satisfies the sampling theorem. Therefore, a result obtainable when the DFT analysis of the data obtained by re-sampling with a sampling period of T/2 is performed indicates the characteristic of the transmission path which includes the recording and reproduction parts.

Then, in Step ST5, the tap coefficient of a sample point equalization filter for performing sample point equalization on the group of re-sample data on the line of interest is obtained from the result of the DFT analysis. In other words, regarding the frequency characteristic of the transmission path obtained through the DFT analysis, only the phase characteristic of a low-frequency component is approximated with a linear function (i.e., with a linear line). Then, an inverse filter characteristic is obtained for correcting the frequency characteristic of the transmission path in accordance with the frequency characteristic approximated with the linear function, and the aforesaid tap coefficient is obtained by performing an inverse DFT analysis of the inverse filter characteristic. The sample point equalization filter consists of a delay line, a coefficient multiplier, an adder and the like, and the tap coefficient set on the basis of the result of the DFT analysis constitutes a coefficient of the coefficient multiplier. A detailed description of the sample point equalization filter is omitted herein.

In Step ST6, a plurality of sample data corresponding to the line of interest are read from the image memory 104, and sample point equalization processing is performed by the sample point equalization filter in which the filter coefficient obtained in Step ST5 has been set. The processed sample data are stored in the image memory 104.

In Step ST7, it is determined whether the count of the line counter in the image signal processing circuit 105 has reached a value corresponding to the last line of one picture. If it is determined that such a value has not yet been reached, the processing operation shown in Steps ST2 to ST6 is repeated. If it is determined that such a value has been reached, it is determined that sample point equalization processing for all the data stored in the image memory 104 has been completed, and the aforesaid sample point equalization processing operation is brought to an end.

Then, amplitude equalization processing is performed in Steps ST8 to ST11 of FIG. 8. First, in Step ST8, a plurality of sample data corresponding to HIT pulses in the respective lines are read from the image memory 104, and the averages of the read sample data corresponding to the respective HIT pulses are obtained.

In Step ST9, a DFT analysis is performed on the averages of the sample data corresponding to the respective HIT pulses which have been obtained in Step ST8. A detailed description of the DFT analysis is omitted herein as stated in the foregoing explanation of the sample point equalization processing.

In Step ST10, the tap coefficient of a waveform equalization filter for correcting the transmission-path characteristic is obtained from the result of the DFT analysis. More specifically, an inverse filter characteristic is obtained so that the frequency characteristic of the HIT pulse obtained by the DFT analysis can be rendered the frequency characteristic of a HIT pulse which is transmitted over an ideal transmission path. The aforesaid tap coefficient is obtained by performing an inverse DFT analysis on the inverse filter characteristic. The waveform equalization filter consists of a delay line, a coefficient multiplier, an adder and the like, and the tap coefficient set on the basis of the result of the DFT analysis constitutes a coefficient of the coefficient multiplier. A detailed description of the waveform equalization filter is omitted herein.

In Step ST11, all the sample data stored in the image memory 104 are read and waveform equalization processing is applied to all the lines by means of the waveform equalization filter in which the filter coefficient obtained in Step ST10 has been set. The processed sample data are stored in the image memory 104.

As described above, after the completion of the sample point equalization processing and the amplitude equalization processing for the image data stored in the image memory 104, the image data stored in the image memory 104 are interpolated as described previously. After the reconstruction of the image has been performed, the reconstructed image is sequentially read and converted into analog data in the D/A converter 106, and the analog data is outputted therefrom.

FIGS. 9(a) to 9(c) show the manner in which sample values corresponding to a HIT pulse on each line before the aforesaid equalization processing are corrected by the above-described sample phase equalization processing and amplitude equalization processing.

FIG. 9(a) is an illustration showing the sample values of the HIT pulse on each line before the equalization processing. As shown in FIG. 9(a), at this stage, the phase offset of re-sample data occurs in each line owing to the distortion of the characteristic of the transmission path, the occurrence of jitters and the like.

FIG. 9(b) is an illustration showing the sample values of the HIT pulse on each line after the sample phase equalization processing. As shown in FIG. 9(b), the phase of the sample point SP on each line is appropriately corrected by the sample point equalization processing.

FIG. 9(c) is an illustration showing the sample values of the HIT pulse on each line after the waveform equalization processing of performing the amplitude equalization processing after the sample phase equalization processing. As shown in FIG. 9(c), the frequency characteristic of each line is corrected appropriately.

In the first embodiment, the entire image signal processing circuit 105 consists of a microcomputer or a DSP (Digital Signal Processor) so that the waveform equalization processing is performed by software alone.

However, the present invention is not limited to such an arrangement, and another arrangement may be employed in which the process of from the DFT analysis to calculations on the tap coefficient of the waveform equalization filter is carried out by the microcomputer or the DSP and actual waveform equalization processing is carried out by hardware.

Figure 10:
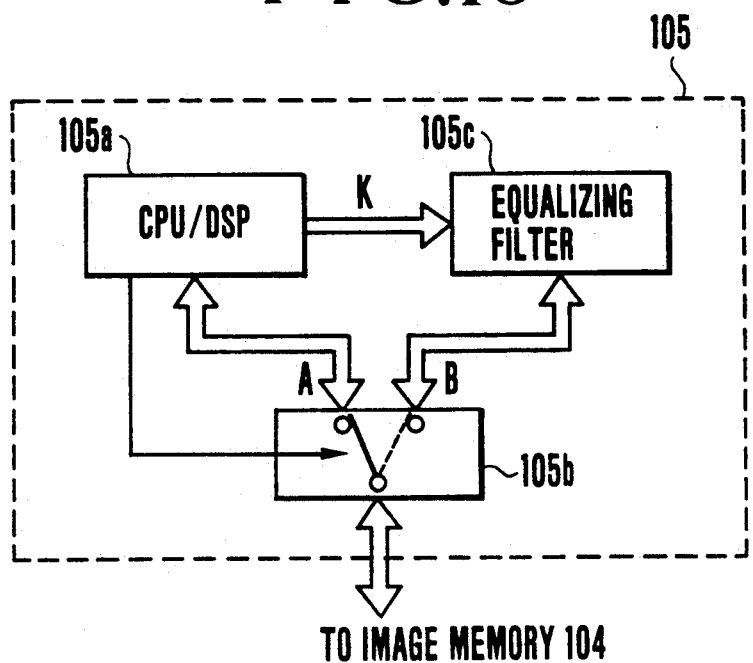
FIG. 10 is a schematic block diagram showing an example of the construction of the image signal processing circuit 105 of FIG. 6 used in the first embodiment.

FIG. 10 is a schematic diagram showing another example of the arrangement of the image signal processing circuit 105 of FIG. 6. A CPU/DSP 105a switches the connection of a switch 105b to the A side shown in FIG. 10 and reads image data stored in the image memory 104, and performs the processing of from the DFT analysis for the sample point equalization processing or the amplitude equalization processing to calculations on the tap coefficient of an equalizing filter. Coefficient data K corresponding to the calculated tap coefficient is supplied to the equalizing filter 105c, thereby setting the tap coefficient of the equalizing filter 105c.

Subsequently, the CPU/DSP 105a switches the connection of the switch 105b to the B side of FIG. 10 and reads the image data, and supplies them to the equalizing filter 105c. After each equalization processing has been performed, the CPU/DSP 105a stores the resultant image data into the image memory 104.

With the above-described arrangement, it is possible to improve the speed of the waveform equalization processing.

As is apparent from the foregoing description, in accordance with the first embodiment, it is possible to provide an image information transmission system capable of accurately transmitting image information without being influenced by time base variations occurring on a transmission path during the transmission of the image information.

Another waveform equalization processing in the image signal processing circuit 105 of FIG. 6 according to a second embodiment of the present invention will be described below.

Since the CHSV system employs a method which is called the analog transmission of sample values as described previously, it is necessary to perform re-sampling in correct phase on a reproduction side. For this reason, as described previously, one HIT pulse whose pulse width T is equivalent to one sampling period is recorded in such a manner that it is added to each horizontal synchronizing period as a phase reference signal as shown in FIG. 5.

Figure 11A:
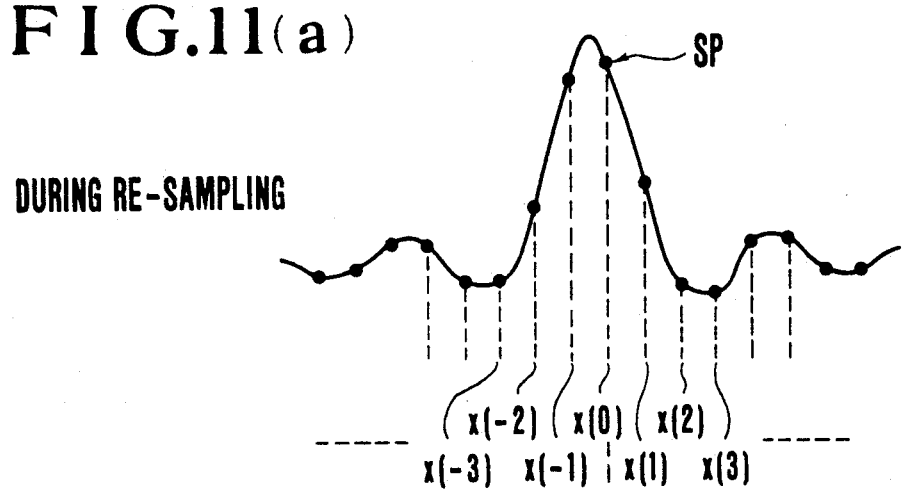
FIGS. 11(a) and 11(b) are explanatory diagrams of waveform equalization processing carried out in a CHSV system according to a second embodiment of the present invention.
Figure 11B:
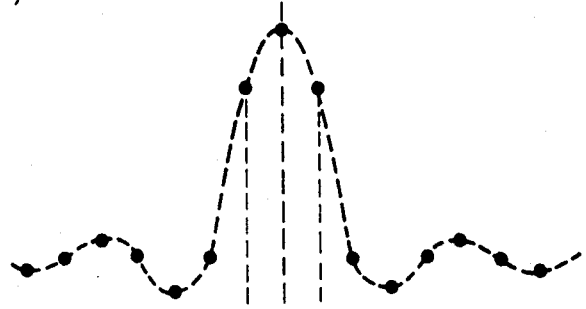

FIG. 11(a) is a diagram showing a waveform formed when such a HIT pulse is re-sampled in the A/D converter 103 of FIG. 6.

The frequency characteristic of the transmission path which includes the recording and reproduction parts is the cosine roll-off characteristic which is centered at the frequency of ½T to satisfy the aforesaid Nyquist condition. Therefore, the data sequence re-sampled at intervals of T/2 in the A/D converter 103 satisfies the well-known sampling theorem. However, as described above, if re-sampling clocks, formed by the PLL circuit 108 on the basis of th pilot signal for TBC in the above-described manner, does not completely follow jitters occurring in the rotating system, the sample point SP does not coincide with the peak point of the HIT pulse as shown in FIG. 11(a).

For this reason, in the second embodiment, the phase offset of the aforesaid re-sampling and the offset of the frequency characteristic of the transmission path with respect to a predetermined cosine roll-off characteristic are corrected for each line of the digital image signal stored in the image memory 104, on the basis of the waveform equalization processing flowchart shown in FIG. 12.

As shown in FIG. 12, first, in Step ST11, the line counter in the image signal processing circuit 105 is reset and, in Step ST2, the count of the line counter is incremented.

In Step ST13, a plurality of sample data corresponding to the HIT pulse in a line of interest are read from the image memory 104 and the sample data SP (refer to FIG. 11(a)) indicative of a peak value is detected from the read plurality of sample data.

Then, in Step ST14, the DFT (discrete Fourier transform) analysis is performed by using sample data centered about the reference value SP indicative of the peak value, detected in Step ST13. Incidentally, since a concrete method of the DFT analysis is as described in "One Measurement Method for Group Delay Characteristics in Television Image Transmission System", the Institute of Television, Publication Vol. 39, No. 11 (1985), a detailed description is omitted herein.

Then, in Step ST15, the tap coefficient of a waveform equalization filter for correcting the group of re-sample data of the HIT pulse in conformity with the group of re-sample data on a HIT pulse transmitted over an ideal transmission path is obtained from the result of the DFT analysis. In other words, an inverse filter characteristic is obtained for correcting the frequency characteristic of the HIT pulse obtained through the DFT analysis in conformity with the frequency characteristic of the HIT pulse transmitted over the ideal transmission path, and the aforesaid tap coefficient is obtained by performing an inverse DFT analysis of the inverse filter characteristic. The waveform equalization filter consists of a delay line, a coefficient multiplier, an adder and the like, and the tap coefficient set on the basis of the result of the DFT analysis constitutes a coefficient of the coefficient multiplier. A detailed description of the waveform equalization filter is omitted herein.

In Step ST16, a plurality of sample data corresponding to the line of interest are read from the image memory 104, and waveform equalization processing is performed by the waveform equalization filter in which the filter coefficient obtained in Step ST15 has been set. The processed sample data are stored in the image memory 104.

In Step ST17, it is determined whether the count of the line counter in the image signal processing circuit 105 has reached a value corresponding to the last line of one picture. If it is determined that such a value has not yet been reached, the processing operation shown in Steps ST12 to ST16 is repeated. If it is determined that such a value has been reached, it is determined that waveform equalization processing for all the data stored in the image memory 104 has been completed, and the aforesaid processing operation is brought to an end.

As described above, after the completion of the waveform equalization processing for the image data stored in the image memory 104, the image data stored in the image memory 104 are interpolated as described previously. After the reconstruction of the image has been performed, the reconstructed image is sequentially read and converted into analog data in the D/A converter 106, and the analog data is outputted therefrom.

In the second embodiment, the entire image signal processing circuit 105 consists of a microcomputer or a DSP (Digital Signal Processor) so that the waveform equalization processing is performed by software alone. However, the present invention is not limited to such an arrangement, and another arrangement may be employed in which the process of from the DFT analysis to calculations on the tap coefficient of the waveform equalization filter is carried out by the microcomputer or the DSP and actual waveform equalization processing is carried out by hardware.

For example, the image signal processing circuit 105 of FIG. 6 may be arranged as shown in FIG. 10 described above. In FIG. 10, the CPU/DSP 105a switches the connection of the switch 105b to the A side shown in FIG. 10 and reads data corresponding to a HIT pulse from among the image data stored in the image memory 104, and performs the processing of from the DFT analysis to calculations on the tap coefficient of an equalizing filter. The coefficient data K corresponding to the calculated tap coefficient is supplied to the waveform equalization filter 105c, thereby setting the tap coefficient of the waveform equalization filter 105c.

Subsequently, the CPU/DSP 105a switches the connection of the switch 105b to the B side of FIG. 10 and reads the image data, and supplies them to the waveform equalization filter 105c. After the waveform equalization processing has been performed, the CPU/DSP 105a stores the resultant image data into the image memory 104.

With the above-described arrangement, it is possible to improve the speed of the waveform equalization processing.

As is apparent from the foregoing description, in accordance with the second embodiment, it is possible to provide an image information transmission system capable of accurately transmitting image information without being influenced by time base variations occurring on a transmission path during the transmission of the image information.

Another waveform equalization processing in the image signal processing circuit 105 of FIG. 6 according to a third embodiment of the present invention will be described below.

Since the CHSV system employs a method which is called the analog transmission of sample values as described previously, it is necessary to perform re-sampling in correct phase on a reproduction side. For this reason, as described previously, one HIT pulse whose pulse width T is equivalent to one sampling period is recorded in such a manner that it is added to each horizontal synchronizing period as a phase reference signal as shown in FIG. 5.

The frequency characteristic of the transmission path which includes the recording and reproduction parts is the cosine roll-off characteristic which is centered at the frequency of $\tfrac{1}{2}T$ to satisfy the aforesaid Nyquist condition. Therefore, the data sequence re-sampled at intervals of T/2 in the A/D converter 103 satisfies the well-known sampling theorem.

Figure 13:
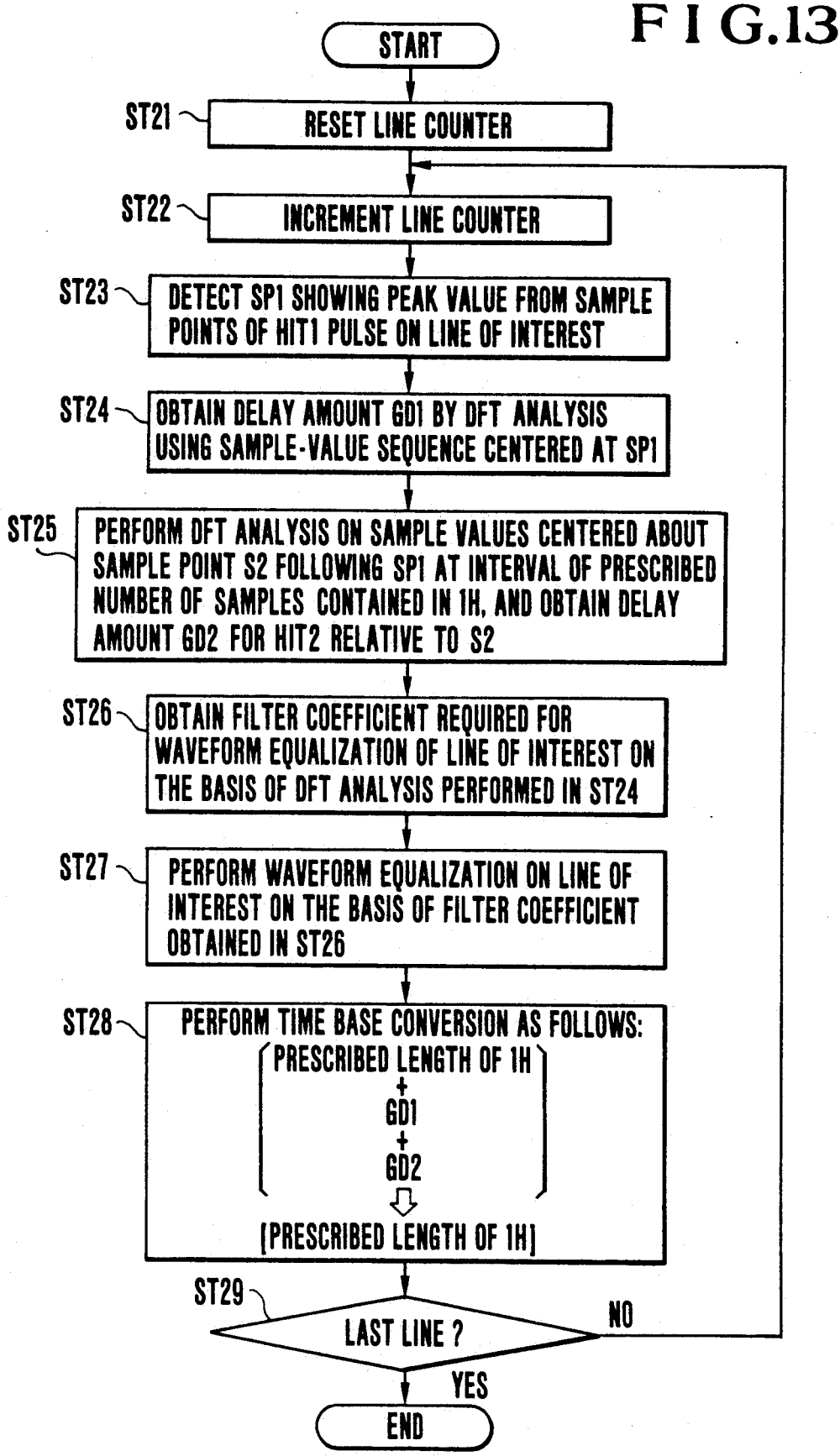
FIG. 13 is a flowchart of a waveform equalization processing operation carried out in the image signal processing circuit 105 of FIG. 6 used in a third embodiment of the present invention.

In the third embodiment, waveform equalization processing and time base correction processing are performed for each line of the digital image signal stored in the image memory 104, on the basis of the processing flowchart shown in FIG. 13.

The waveform equalization processing is the processing of concurrently performing correction for the phase offset of re-sampling with respect to the peak value of a HIT pulse and the offset of the frequency characteristic of the transmission path with respect to a predetermined cosine roll-off characteristic. The time base correction processing is the processing of correcting time base variations due to jitters occurring in a rotating system for a magnetic disc.

As shown in FIG. 13, first, in Step ST21, the line counter in the image signal processing circuit 105 is reset and, in Step ST22, the count of the line counter is incremented.

Figure 14:
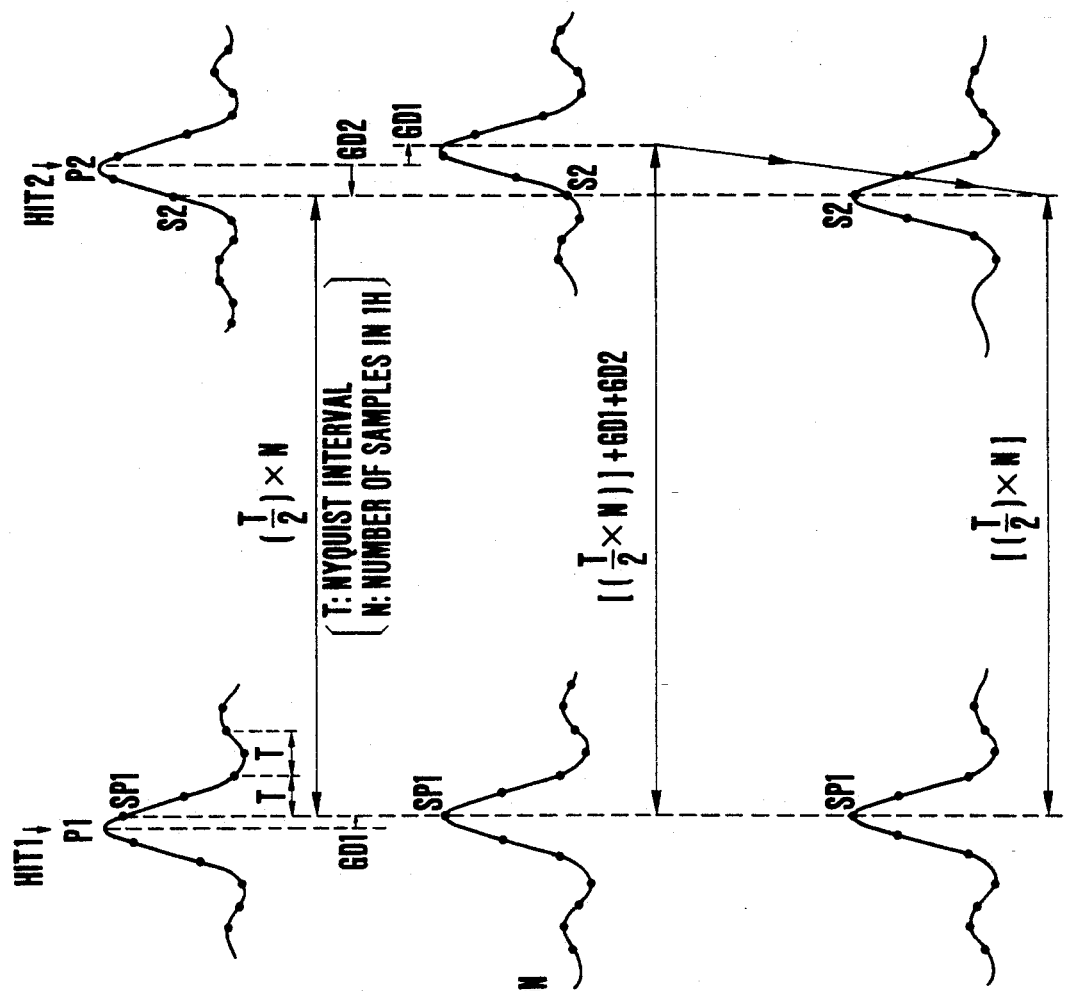
FIGS. 14(a), 14(b) and 14(c) are schematic illustrations showing the manner in which HIT pulses are corrected by waveform equalization processing and time base correction processing according to the third embodiment.

In Step ST23, a plurality of sample data corresponding to a HIT pulse (HIT1) in a line of interest are read from the image memory 104 and sample data SP1 (refer to FIG. 14(a)) indicative of a peak value is detected from the read plurality of sample data.

Then, in Step ST24, the DFT (discrete Fourier transform) analysis is performed by using sample data centered about the sample data SP1 indicative of the peak value, detected in Step ST23, thereby providing a time difference GD1 between the sample data SP1 and a peak value P1 of the reproduced waveform of HIT1 before re-sampling.

In this case, the time difference GD1 is substantially equal to the amount of group delay at low frequencies obtained by the DFT analysis. This amount of group delay is rendered the value of the time difference GD1.

Incidentally, since a concrete method of the DFT analysis is as described in "One Measurement Method for Group Delay Characteristics in Television Image Transmission System", the Institute of Television, Publication Vol. 39, No. 11 (1985), a detailed description is omitted herein.

Then, in Step ST25, a sample point S2 is obtained which follows the sample data SP1 at an interval of a prescribed number of sample data present in one horizontal scanning period (1H) (the sample point S2: a position corresponding to a HIT pulse in the next 1H stored in the same track on a magnetic disc). As in Step ST24, the DFT analysis is performed by using sample data centered around the sample point S2, thereby providing the amount of delay, GD2, of the sample point S2 with respect to the peak position of a HIT pulse (HIT2) (refer to FIG. 14(a)).

Then, in Step ST26, the tap coefficient of a waveform equalization filter for correcting the group of re-sample data of the HIT pulse (HIT1) in conformity with the group of re-sample data on a HIT pulse transmitted over an ideal transmission path is obtained from the result of the DFT analysis performed in Step ST24. In other words, an inverse filter characteristic is obtained for correcting the frequency characteristic of the HIT pulse (HIT1) obtained through the DFT analysis in conformity with the frequency characteristic of the HIT pulse transmitted over the ideal transmission path, and the aforesaid tap coefficient is obtained by performing an inverse DFT analysis of the inverse filter characteristic. The waveform equalization filter consists of a delay line, a coefficient multiplier, an adder and the like, and the tap coefficient set on the basis of the result of the DFT analysis constitutes a coefficient of the coefficient multiplier. A detailed description of the waveform equalization filter is omitted herein.

In Step ST27, a plurality of sample data corresponding to the line of interest are read from the image memory 104, and waveform equalization processing is performed by the waveform equalization filter in which the filter coefficient obtained in Step ST26 has been set. Thus, as shown in FIG. 14(b), in addition to the equalization of the frequency characteristic of the transmission path, correction is performed so that the re-sample phase of the HIT pulse (HIT1) can be made correct.

However, if only the aforesaid processing is performed, there remain jitters occurring in the rotating system for a magnetic disc and no sample points coincide in the last portion of a 1H period. Accordingly, the processing of Step ST28 is performed.

More specifically, in Step ST28, the time base conversion processing of converting into the prescribed time period of 1H the time period obtained by adding together the prescribed time period of 1H and the GD1 and GD2 obtained in Steps ST24 and ST25 is carried out (conversion and equalization of a sampling rate). The sample data thus processed are stored in the image memory 104.

In Step ST29, it is determined whether the count of the line counter in the image signal processing circuit 105 has reached a value corresponding to the last line of one picture. If it is determined that such a value has not yet been reached, the processing operation shown in Steps ST22 to ST28 is repeated. If it is determined that such a value has been reached, it is determined that waveform equalization processing and time base correction processing for all the data stored in the image memory 104 have been completed, and the aforesaid processing operation is brought to an end.

By applying the above-described processing, the HIT pulses HIT1 and HIT2 are, as shown in FIG. 14(c), corrected to satisfy the previously-described two conditions of the analog transmission of sample values. After the completion of the waveform equalization processing and the time base correction processing for the image data stored in the image memory 104, the image data stored in the image memory 104 are interpolated as described previously. After the reconstruction of the image has been performed, the reconstructed image is sequentially read and converted into analog data in the D/A converter 106, and the analog data is outputted therefrom.

In the second embodiment, the entire image signal processing circuit 105 consists of a microcomputer or a DSP (Digital Signal Processor) so that the waveform equalization processing is performed by software alone. However, the present invention is not limited to such an arrangement, and another arrangement may be employed in which the process of from the DFT analysis to calculations on the tap coefficient of the waveform equalization filter is carried out by the microcomputer or the DSP and actual waveform equalization processing is carried out by hardware.

For example, the image signal processing circuit 105 of FIG. 6 may be arranged as shown in FIG. 10 described above. In FIG. 10, the CPU/DSP 105a switches the connection of the switch 105b to the A side shown in FIG. 10 and reads data corresponding to a HIT pulse from among the image data stored in the image memory 104, and performs the processing of from the DFT analysis to calculations on the tap coefficient of an equalizing filter. The coefficient data K corresponding to the calculated tap coefficient is supplied to the waveform equalization filter 105c, thereby setting the tap coefficient of the waveform equalization filter 105c.

Subsequently, the CPU/DSP 105a switches the connection of the switch 105b to the B side of FIG. 10 and reads the image data, and supplies them to the waveform equalization filter 105c. After the waveform equalization processing has been performed, the CPU/DSP 105a stores the resultant image data into the image memory 104.

With the above-described arrangement, it is possible to improve the speed of the waveform equalization processing.

As is apparent from the foregoing description, and in accordance with the second embodiment, it is possible to provide an image information transmission system capable of accurately transmitting image information without being influenced by time base variations occurring on a transmission path during the transmission of the image information.

A sample point equalization processing in the image signal processing circuit 105 of FIG. 6 according to a fourth embodiment of the present invention will be described below.

Since the CHSV system employs a method which is called the analog transmission of sample values as described previously, it is necessary to perform re-sampling in correct phase on a reproduction side. For this reason, as described previously, one HIT pulse whose pulse width T is equivalent to one sampling period is recorded in such a manner that it is added to each horizontal synchronizing period as a phase reference signal as shown in FIG. 5.

The frequency characteristic of the transmission path which includes the recording and reproduction parts is the cosine roll-off characteristic which is centered at the frequency of $\frac{1}{2}T$ to satisfy the aforesaid Nyquist condition. Therefore, the data sequence re-sampled at intervals of T/2 in the A/D converter 103 satisfies the well-known sampling theorem.

Figure 15:
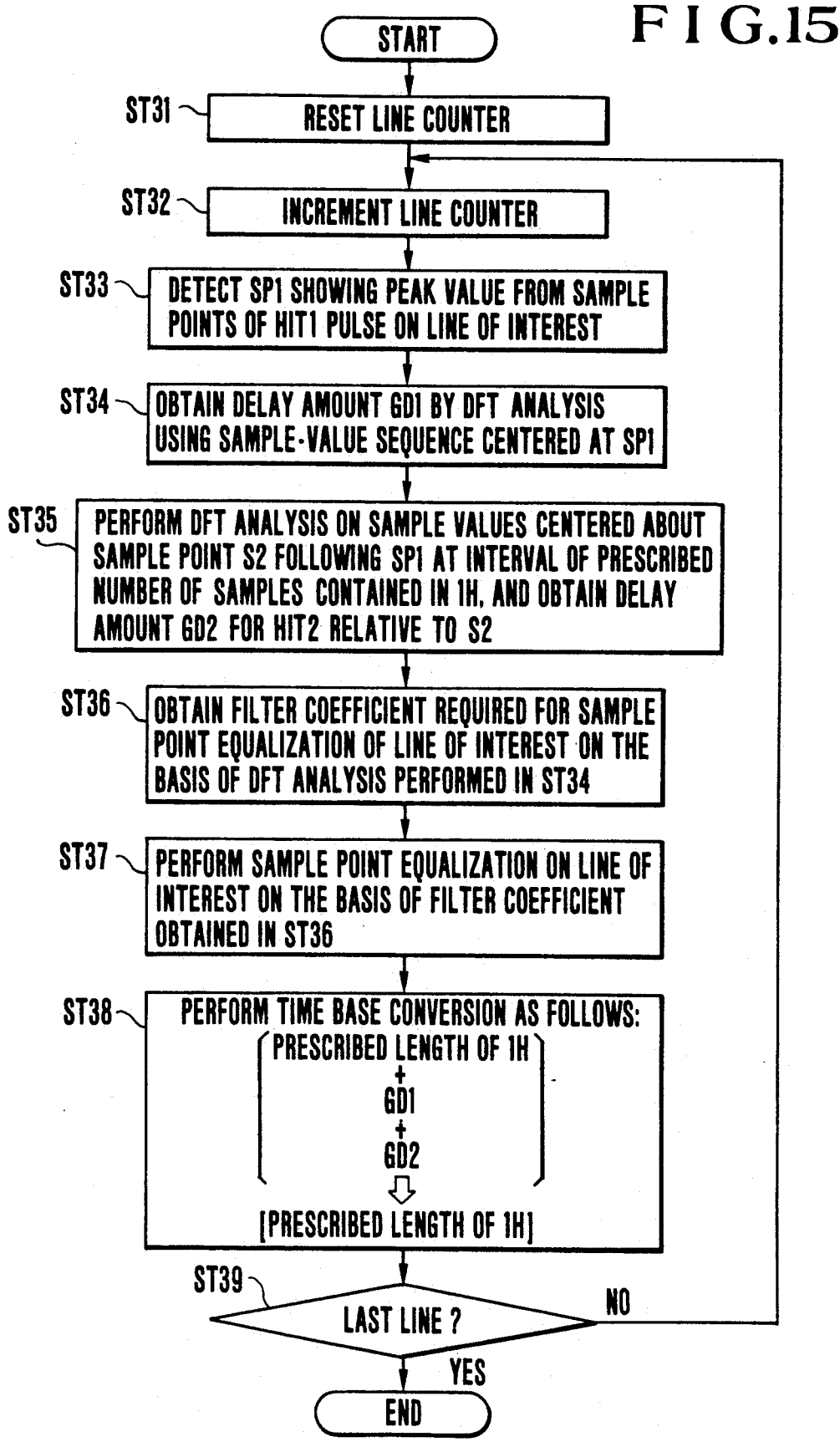
FIG. 15 is a flowchart of a sample point equalization processing operation carried out in the image signal processing circuit 105 of FIG. 6 used in a fourth embodiment of the present invention.

In the fourth embodiment, sample point equalization processing and time base correction processing are performed for each line of the digital image signal stored in the image memory 104, on the basis of the processing flowchart shown in FIG. 15.

The sample point equalization processing includes the processing of performing the operation of correcting the phase offset of re-sampling with respect to the peak value of a HIT pulse and also the processing of correcting time base variations due to jitters occurring in the rotating system for a magnetic disc.

As shown in FIG. 15, first, in Step ST31, the line counter in the image signal processing circuit 105 is reset and, in Step ST32, the count of the line counter is incremented.

In Step ST33, a plurality of sample data corresponding to the HIT pulse (HIT1) in a line of interest are read from the image memory 104 and the sample data SP1 (refer to FIG. 16(a)) indicative of a peak value is detected from the read plurality of sample data.

Then, in Step ST34, the DFT (discrete Fourier transform) analysis is performed by using sample data centered about the sample data SP1 indicative of the peak value, detected in Step ST33, thereby providing the time difference GD1 between the sample data SP1 and the peak value P1 of the reproduced waveform of HIT1 before re-sampling.

In this case, the time difference GD1 is substantially equal to the amount of group delay at low frequencies obtained by the DFT analysis. This amount of group delay is rendered the value of the time difference GD1.

Incidentally, since a concrete method of the DFT analysis is as described in "One Measurement Method for Group Delay Characteristics in Television Image Transmission System", the Institute of Television, Publication Vol. 39, No. 11 (1985), a detailed description is omitted herein.

Then, in Step ST35, the sample point S2 is obtained which follows the sample data SP1 at an interval of a prescribed number of sample data present in one horizontal scanning period (1H) (the sample point S2: a position corresponding to a HIT pulse in the next 1H stored in the same track on the magnetic disc). As in Step ST34, the DFT analysis is performed by using sample data centered around the sample point S2, thereby providing the amount of delay, GD2, of the sample point S2 with respect to the peak position of the HIT pulse (HIT2) (refer to FIG. 16(a)). Then, in Step ST36, the tap coefficient of a sample point equalization filter for rendering the group of sample data of the HIT pulse (HIT1) the group of sample data for sampling the peak point P1 of the HIT pulse (refer to FIG. 16(a)) is obtained from the result of the DFT analysis performed in Step ST34. In other words, an inverse filter characteristic is obtained for rendering the frequency characteristic of the HIT pulse (HIT1) obtained through the DFT analysis as a pass frequency characteristic of linear phase, and the aforesaid tap coefficient is obtained by performing an inverse DFT analysis of the inverse filter characteristic. The sample point equalization filter consists of a delay line, a coefficient multiplier, an adder and the like, and the tap coefficient set on the basis of the result of the DFT analysis constitutes a coefficient of the coefficient multiplier. A detailed description of the sample point equalization filter is omitted herein.

In Step ST37, a plurality of sample data corresponding to the line of interest are read from the image memory 104, and sample point equalization processing is performed by the sample point equalization filter in which the filter coefficient obtained in Step ST36 has been set. Thus, as shown in FIG. 16(b), correction is performed so that the re-sample phase of the HIT pulse (HIT1) on the transmission path can be made correct.

However, if only the aforesaid processing is performed, there remain jitters occurring in the rotating system for the magnetic disc and no sample points coincide in the last portion of a 1H period. Accordingly, the next processing of Step ST38 is performed.

More specifically, in Step ST38, the time base conversion processing of converting into the prescribed time period of 1H the time period obtained by adding together the prescribed time period of 1H and the GD1 and GD2 obtained in Steps ST34 and ST35 is carried out (conversion and equalization of a sampling rate). The sample data thus processed are stored in the image memory 104.

In Step ST39, it is determined whether the count of the line counter in the image signal processing circuit 105 has reached a value corresponding to the last line of one picture. If it is determined that such a value has not yet been reached, the processing operation shown in Steps ST32 to ST38 is repeated. If it is determined that such a value has been reached, it is determined that sample point equalization processing and time base correction processing for all the data stored in the image memory 104 have been completed, and the aforesaid processing operation is brought to an end.

By applying the above-described processing, the HIT pulses HIT1 and HIT2 are corrected so that the influence of the jitters occurring in the rotating system for the magnetic disk is completely eliminated as shown in FIG. 16(c).

As described above, after the completion of the sample point equalization processing and time base correction processing for the image data stored in the image memory 104, the image data stored in the image memory 104 are interpolated as described previously. After the reconstruction of the image has been performed, the reconstructed image is sequentially read and converted into analog data in the D/A converter 106, and the analog data is outputted therefrom.

In the fourth embodiment, the entire image signal processing circuit 105 consists of a microcomputer or a DSP (Digital Signal Processor) so that the sample point equalization processing is performed by software alone. However, the present invention is not limited to such an arrangement, and another arrangement may be employed in which the process from the DFT analysis to calculations on the tap coefficient of the sample point equalization filter is carried out by the microcomputer or the DSP and actual waveform equalization processing is carried out by hardware.

For example, the image signal processing circuit 105⁻ of FIG. 6 may be arranged as shown in FIG. 10 described above. In FIG. 10, the CPU/DSP 105a switches the connection of the switch 105b to the A side shown in FIG. 10 and reads data corresponding to a HIT pulse from among the image data stored in the image memory 104, and performs the processing from the DFT analysis to calculations on the tap coefficient of the sample point equalization filter. The coefficient data K corresponding to the calculated tap coefficient is supplied to the sample point equalization filter 105c, thereby setting the tap coefficient of the sample point equalization filter 105c.

Subsequently, the CPU/DSP 105a switches the connection of the switch 105b to the B side of FIG. 10 and reads the image data, and supplies them to the sample point equalization filter 105c. After the waveform equalization processing has been performed, the CPU/DSP 105a stores the resultant image data into the image memory 104.

With the above-described arrangement, it is possible to improve the speed of the sample point equalization processing.

As is apparent from the foregoing description, in accordance with the fourth embodiment, it is possible to provide an image information transmission system capable of accurately transmitting image information without being influenced by time base variations occurring on a transmission path during the transmission of the image information.

What is claimed is:

1. An image information transmission system for transmitting image information, comprising:
   (A) digital-image-data forming means for receiving a transmitted analog image signal, sampling the received analog image signal, and forming digital image data;
   (B) transmission-path-characteristic setting means for setting a transmission-path characteristic by performing discrete Fourier transform operations on data which constitute a predetermined part of the digital image data formed by said digital-image-data forming means; and
   (C) waveform equalization correcting filter means for applying waveform equalization correction processing to the digital image data formed by said digital-image-data forming means, in accordance with the transmission-path characteristic set by said transmission-path-characteristic setting means.

2. An image information transmission system according to claim 1, wherein the analog image signal received by said digital-image-data forming means includes a sample-value analog-transmission image signal which is sampled on a transmission side and transmitted by analog transmission.

3. An image information transmission system according to claim 1, wherein the analog image signal received by said digital-image-data forming means is an image signal in which at least one reference pulse is added in a blanking period.

4. An image information transmission system according to claim 3, wherein said transmission-path-characteristic setting means is arranged to set the transmission-path characteristic by performing the discrete Fourier transform operations on data corresponding to a part, to which the reference pulse is added, of the digital image data formed by said digital-image-data forming means.

5. An image information transmission system according to claim 1, wherein the analog image signal received by said digital-image-data forming means includes a reproduced analog image signal reproduced from a recording medium.

6. An image information transmission system according to claim 1, further comprising time base correction processing means for applying time base correction to the digital image data to which the waveform equalization correction processing is applied by said waveform equalization correction processing means.

7. An image information transmission system according to claim 1, wherein said transmission-path-characteristic setting means is arranged to set a filter coefficient of said waveform equalizing correcting filter means by performing the discrete Fourier transform operations on the data which constitute the predetermined part of the digital image data formed by said digital-image-data forming means.

8. An image information transmission system for transmitting image information, comprising:
(A) digital-image-data forming means for receiving a transmitted analog image signal, sampling the received analog image signal, and forming digital image data;
(B) transmission-path-characteristic setting means for setting a transmission-path characteristic by performing discrete Fourier transform operations on data which constitute a predetermined part of the digital image data formed by said digital-image-data forming means; and
(C) sample point equalization correction processing means for applying sample point equalization correction processing to the digital image data formed by said digital-image-data forming means, in accordance with the transmission-path characteristic set by said transmission-path-characteristic setting means.

9. An image information transmission system according to claim 8, wherein the analog image signal received by said digital-image-data forming means includes a sample-value analog-transmission image signal which is sampled on a transmission side and transmitted by analog transmission.

10. An image information transmission system according to claim 8, wherein the analog image signal received by said digital-image-data forming means is an image signal in which at least one reference pulse is added in a blanking period.

11. An image information transmission system according to claim 10, wherein said transmission-path-characteristic setting means is arranged to set the transmission-path characteristic by performing the discrete Fourier transform operations on data corresponding to a part, to which the reference pulse is added, of the digital image data formed by said digital-image-data forming means.

12. An image information transmission system according to claim 8, wherein the analog image signal received by said digital-image-data forming means includes a reproduced analog image signal reproduced from a recording medium.

13. An image information transmission system according to claim 8, further comprising time base correction processing mean for applying time base correction to the digital image data to which the sample point equalization correction processing is applied by said sample point equalization correction processing means.

14. An image information transmission system according to claim 8, wherein said sample point equalization correction processing means includes an equalizing filter for applying the sample point equalization correction processing to the digital image data formed by said digital-image-data forming means, said transmission-path-characteristic setting means being arranged to set a filter coefficient of the equalizing filter by performing the discrete Fourier transform operations on the data which constitute the predetermined part of the digital image data formed by said digital-image-data forming means.

15. An image information transmission system for transmitting image information, comprising:
(A) digital-image-data forming means for receiving a transmitted analog image signal, sampling the received analog image signal, and forming digital image data;
(B) first-transmission-path-characteristic setting means for setting a first transmission-path characteristic by performing discrete Fourier transform operations on data which constitute a predetermined part of the digital image data formed by said digital-image-data forming means;
(C) sample phase equalization correction processing means for applying sample phase equalization correction processing to the digital image data formed by said digital-image-data forming means, in accordance with the first transmission-path characteristic set by said first-transmission-path-characteristic setting means;
(D) second-transmission-path-characteristic setting means for setting a second transmission-path characteristic by performing discrete Fourier transform operations on average values of data which constitute a predetermined part of the digital image data formed by said digital-image-data forming means; and
(E) amplitude equalization correction processing means for applying amplitude equalization correction processing to the digital image data formed by said digital-image-data forming means, in accordance with the second transmission-path characteristic set by said second-transmission-path-characteristic setting means.

16. An image information transmission system according to claim 15, wherein the analog image signal received by said digital-image-data forming means includes a sample-value analog-transmission image signal which is sampled on a transmission side and transmitted by analog transmission.

17. An image information transmission system according to claim 15, wherein the analog image signal received by said digital-image-data forming means is an image signal in which at least one reference pulse is added in a blanking period.

18. An image information transmission system according to claim 17, wherein said first-transmission-path-characteristic setting means is arranged to set the first transmission-path characteristic by performing the discrete Fourier transform operations on data corresponding to a part, to which the reference pulse is added, of the digital image data formed by said digital-image-data forming means.

19. An image information transmission system according to claim 17, wherein said second-transmission-path-characteristic setting means is arranged to set the second transmission-path characteristic by performing the discrete Fourier transform operations on average values of data corresponding to a part, to which the reference pulse is added, of the digital image data formed by said digital-image-data forming means.

20. An image information transmission system according to claim 15, wherein the analog image signal received by said digital-image-data forming means is an image signal in which at least one reference pulse is added in each blanking period.

21. An image information transmission system according to claim 20, wherein said first-transmission-path-characteristic setting means is arranged to set the first transmission-path characteristic for each horizontal scanning period of an image by performing the discrete Fourier transform operations on data corresponding to a part, to which the reference pulse is added, of the digital image data formed by said digital-image-data forming means.

22. An image information transmission system according to claim 20, wherein said second-transmission-path-characteristic setting means is arranged to set the second transmission-path characteristic for each image by performing the discrete Fourier transform operations on average values of data corresponding to a part, to which the reference pulse is added, of the digital image data formed by said digital-image-data forming means.

23. An image information transmission system according to claim 15, wherein the analog image signal received by said digital-image-data forming means includes a reproduced analog image signal reproduced from a recording medium.

24. An image information transmission system according to claim 15, wherein said digital-image-data forming means includes memory means for receiving the transmitted analog image signal, sampling the received analog image signal, forming digital image data, and storing the formed digital image data.

25. An image information transmission system according to claim 15, wherein said sample phase equalization correction processing means includes an equalizing filter for applying the sample phase equalization correction processing to the digital image data formed by said digital-image-data forming means, said first-transmission-path-characteristic setting means being arranged to set a filter coefficient of the equalizing filter by performing the discrete Fourier transform operations on the data which constitute the predetermined part of the digital image data formed by said digital-image-data forming means.

26. An image information transmission system according to claim 15, wherein said amplitude equalization correction processing means includes an equalizing filter for applying the amplitude equalization correction processing to the digital image data formed by said digital-image-data forming means, said second-transmission-path-characteristic setting means being arranged to set a filter coefficient of the equalizing filter by performing the discrete Fourier transform operations on the average values of the data which constitute the predetermined part of the digital image data formed by said digital-image-data forming means.

* * * * *